(12) United States Patent
Prabhudesai et al.

(10) Patent No.: US 9,218,653 B2
(45) Date of Patent: Dec. 22, 2015

(54) METHOD AND APPARATUS FOR DYNAMIC RANGE ENHANCEMENT OF AN IMAGE

(71) Applicant: Samsung Electronics Co., Ltd., Gyeonggi-do (KR)

(72) Inventors: Parijat Prakash Prabhudesai, Bangalore (IN); Sabari Raju Shanmugam, Bangalore (IN); Narasimha Gopalakrishna Pai, Bangalore (IN)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/341,679

(22) Filed: Jul. 25, 2014

(65) Prior Publication Data

US 2015/0043811 A1 Feb. 12, 2015

(30) Foreign Application Priority Data

Aug. 12, 2013 (IN) ............................ 3579/CHE/2013
Oct. 14, 2013 (KR) ........................ 10-2013-0122017

(51) Int. Cl.
G06K 9/40 (2006.01)
G06T 5/50 (2006.01)
G06T 5/00 (2006.01)
H04N 5/235 (2006.01)

(52) U.S. Cl.
CPC . *G06T 5/50* (2013.01); *G06T 5/008* (2013.01); *H04N 5/2355* (2013.01); *G06T 2207/10144* (2013.01); *G06T 2207/20221* (2013.01); *H04N 5/2356* (2013.01)

(58) Field of Classification Search
USPC ......... 382/275, 254, 173, 171, 164, 274, 294; 348/229.1, E5.037, 234, 364; 351/209, 351/210; 345/427; 250/205; 128/898
See application file for complete search history.

(56) References Cited

U.S. PATENT DOCUMENTS 8,048,065 B2 * 11/2011 Grecu et al. .................... 606/10
8,570,396 B2 10/2013 Rapaport
8,591,030 B2 * 11/2013 Grecu et al. ................. 351/209
8,610,738 B2 12/2013 Choe et al.
2010/0103194 A1 4/2010 Chen et al.

(Continued)

FOREIGN PATENT DOCUMENTS

KR 10-2005-0082256 8/2005
KR 20100069307 A 6/2010
KR 101225482 B1 1/2013

OTHER PUBLICATIONS

International Search Report dated Nov. 11, 2014 in connection with International Application No. PCT/KR2014/007162; 3 pages.

(Continued)

*Primary Examiner* — Anh Do

(57) ABSTRACT

A method and apparatus are provided for enhancing the local dynamic range of an image using the contents of exposure bracketed image set without affecting overall dynamic range of the image. The method allows a user to select at least one region of a reference image for enhancement after receiving the reference image from the user. Further the method comprises segmenting the reference image by using exposure weights, and selects an enhancement support image from an exposure bracketed image set. Furthermore the method determines weight maps of reference and enhancement support images and generates dynamic range enhanced reference image using determined weight maps.

20 Claims, 9 Drawing Sheets

(56) References Cited

U.S. PATENT DOCUMENTS

| | | |
|---|---|---|
| 2010/0150473 A1 | 6/2010 | Kwon et al. |
| 2010/0164976 A1 | 7/2010 | Choe et al. |
| 2011/0211732 A1 | 9/2011 | Rapaport |
| 2012/0236162 A1 | 9/2012 | Imamura |
| 2014/0247985 A1 | 9/2014 | Park |

OTHER PUBLICATIONS

Written Opinion of International Searching Authority dated Nov. 11, 2014 in connection with international Application No. PCT/KR2014/007162; 4 pages.

* cited by examiner

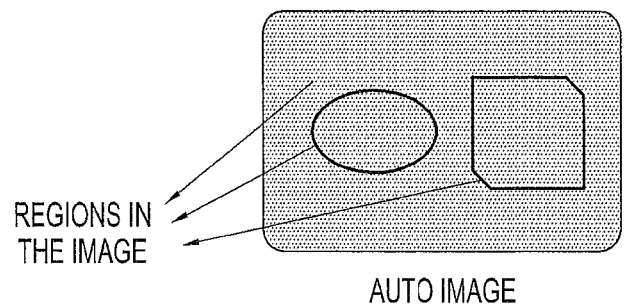 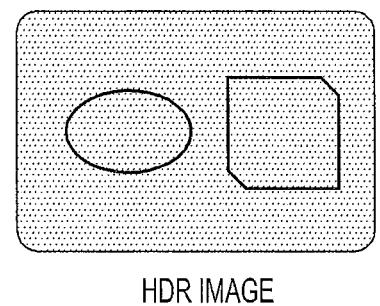
FIG.9A — AUTO IMAGE
FIG.9B — HDR IMAGE
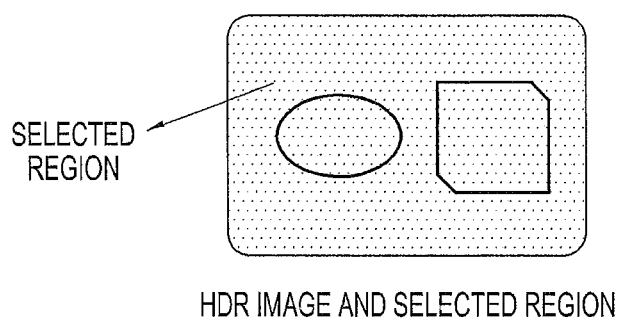 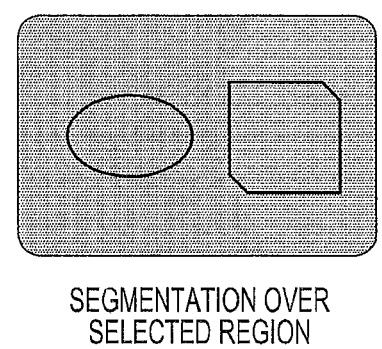
FIG.9C — HDR IMAGE AND SELECTED REGION
FIG.9D — SEGMENTATION OVER SELECTED REGION
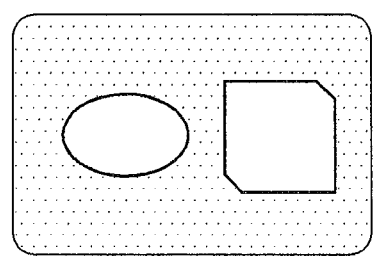
FIG.9E — HDR IMAGE AFTER ENHANCEMENT

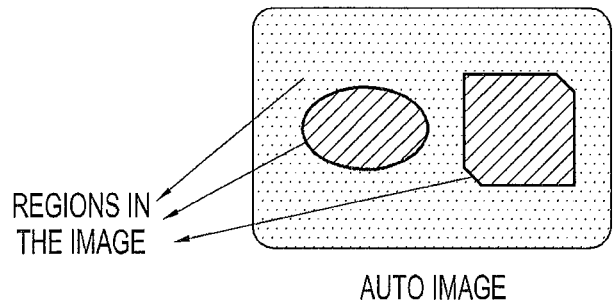
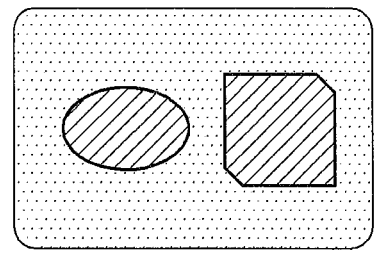
FIG.10A  FIG.10B
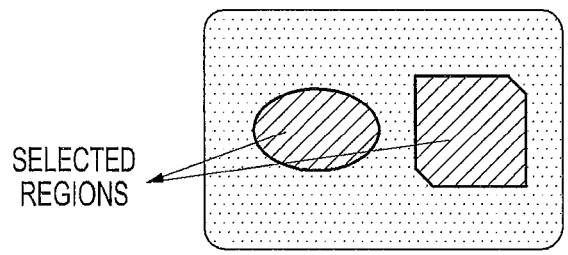
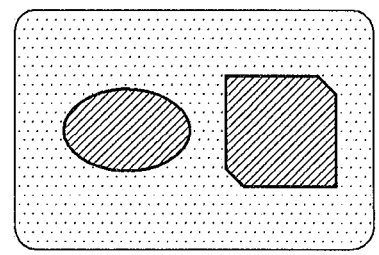
FIG.10C  FIG.10D
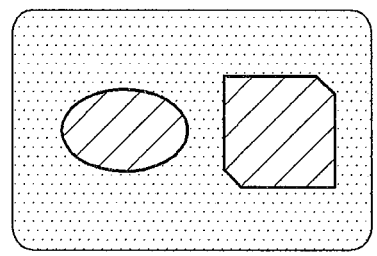
FIG.10E

AUTO IMAGE

HDR IMAGE

HDR IMAGE AND SELECTED REGION

HDR IMAGE AFTER ENHANCEMENT

METHOD AND APPARATUS FOR DYNAMIC RANGE ENHANCEMENT OF AN IMAGE

CROSS-REFERENCE TO RELATED APPLICATION(S) AND CLAIM OF PRIORITY

The present application is related to and claims priority under 35 U.S.C. §119(a) to Indian Patent Application Serial No. 3579/CHE/2013, which was filed Indian Patent Office on Aug. 12, 2013 and Korean Application Serial No. 10-2013-0122017, which was filed in the Korean Intellectual Property Office on Oct. 14, 2013, the entire content of which is hereby incorporated by reference.

TECHNICAL FIELD

The present disclosure relates to a method and a apparatus for enhancing dynamic range of an image, and more particularly relates to a method and apparatus for enhancing local dynamic range of the image using the contents of exposure bracketed images.

BACKGROUND

Image sensing devices, such as a charge-coupled device (CCD), are commonly found in such products as digital cameras, scanners, and video cameras. These image sensing devices have a very limited dynamic range when compared to traditional negative film products. A image sensing device has a dynamic range of about five stops.

In addition, oftentimes the scene has a very wide dynamic range as a result of multiple illuminants (e.g. frontlit and backlit portions of a scene). In the embodiment of a wide dynamic range scene, choosing an appropriate exposure for the subject often necessitates clipping data in another part of the image. Thus, the inferior dynamic range of an image sensing device relative to silver halide media results in lower quality for images obtained by an image sensing device. Therefore some portions of the image can be over-exposed or under-exposed.

High Dynamic Range (HDR) imaging methods provide higher dynamic range image as compared to the single image capture using conventional camera. HDR imaging has become one of the inherent features on handheld cameras and photo-editing tools. This method of obtaining an image with increased dynamic range is by capturing multiple still images of the same resolution at different exposures, and combining the images into a single output image having increased dynamic range. This approach often uses a separate capture mode and processing path in a digital camera.

Additionally, the temporal proximity of multiple captures is limited by the rate at which the images can be read out from the image sensor. Greater temporal disparity among captures increases the likelihood of motion existing among the captures, whether camera motion related to hand jitter, or scene motion resulting from objects moving within the scene. Motion increases the difficulty in merging multiple images into a single output image.

Additionally, the HDR image generation from multiple exposed images provides increased shadow, middle tone and highlight detail which might not be optimal to the expectation of the user.

Additionally, this single output image, called radiance map, uses more than 8-bit per pixel/channel and cannot be displayed on the Liquid Crystal Display (LCD) or Light Emitting Diode (LED) displays found in current devices and hence have to be tone mapped to 8-bit representation, called Low Dynamic Range (LDR) image. The operator used for this mapping, called Tone mapping operator, maps the radiance map into a low dynamic range image. As a result of this process, some of the regions with comparatively lesser contrast might be represented using lesser colors than rest of the image. Therefore the user might use enhancement of the dynamic range of these regions without affecting the rest of the image. There exist some methods in art for enhancing overall dynamic range of the image.

The generation of HDR image uses one to estimate the camera response function (CRF) and to know the exposure settings. For such methods, dynamic scenes pose a challenge as the moving objects produce artifacts called 'ghosts' in the final image. For a dynamic scene, one has to perform additional operations to remove the ghosts introduced due to moving objects in the scene. This process, known as de-ghosting, can be performed by replacing the pixel intensities of the motion regions from one or more of the multi-exposure images without any local motion. De-ghosting algorithms are used to reduce this artifact but, due to the exposure difference in the image capture, the de-ghosting algorithm may not detect or wrongly detect ghosts, hence degrading the HDR image quality.

SUMMARY

The principal object of embodiments herein is to provide a method and apparatus for enhancing local dynamic range of an image by using the contents of exposure bracketed images.

Another object of the present disclosure is to provide a method and apparatus for reducing ghosting artifacts of the image to improve the High Dynamic Range (HDR) image quality.

To address the above-discussed deficiencies, it is a primary object to provide a method for enhancing dynamic range of a reference image, further the method comprises selecting at least one region of the reference image for enhancement. The method further comprises segmenting the reference image by applying exposure weights. Further the method comprises selecting an enhancement support image from an exposure bracketed image set and determines weight maps of the selected at least one region of the reference image and the enhancement support image. Further the method comprises generating the enhanced dynamic range of the reference image.

Accordingly the present disclosure provides a method for reducing ghosting artifacts of a reference image, further the method comprises selecting at least one region of the reference image for ghost and selects an enhancement support image from an exposure bracketed image set. Further the method comprises determining weight maps of selected regions of the reference and enhancement support images and generates the enhanced reference image.

These and other aspects of the embodiments herein will be better appreciated and understood when considered in conjunction with the following description and the accompanying drawings. It should be understood, however, that the following descriptions, while indicating different embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A-9E illustrates an example method for enhancing dynamic range of bright areas of an image, according to embodiments disclosed herein;

FIG. 10A-10E illustrates an example method for enhancing dynamic range of dark areas in an image, according to embodiments disclosed herein.

DETAILED DESCRIPTION

Figure 1:
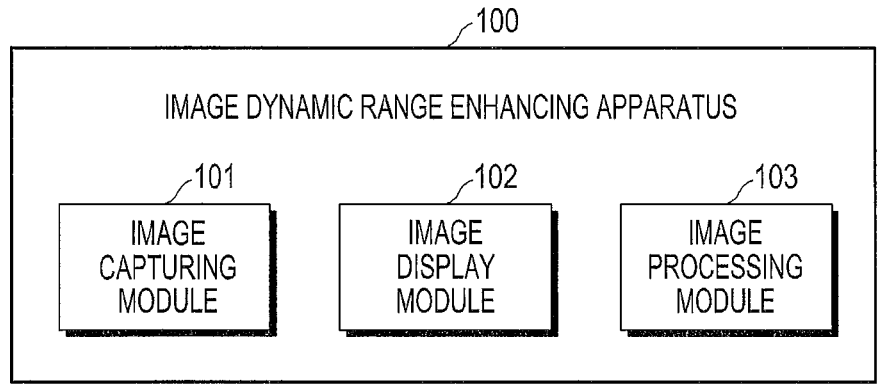
FIG. 1 illustrates a general block diagram of a apparatus for enhancing local dynamic range of an image, according to embodiments disclosed herein.

FIGS. 1 through 11D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and apparatus for enhancing dynamic range of selected regions of a High Dynamic Range (HDR) image and reducing ghosting artifacts of the image using contents of an exposure bracketed image set. The image set comprises a plurality of images of same scene captured at a range of different exposures. The proposed method receives a reference image from a user and selects desired regions of the reference image to be enhanced, and segments the regions of the reference image. Further the method is capable of compensating global motion (image capturing device movement/hand-shakes) of the image capturing device by correcting global shifts in all the images of the exposure bracketed image set with respect to the reference image. Furthermore, the method allows the user to select desired modifications or enhancement, i.e., to increase or decrease the dynamic range of those particular regions. These selected regions are corrected using an enhancement support image selected from the exposure bracketed image set.

Alternatively, in one mode or implementation of the method, weights for the enhancement support image in selected regions are determined based on predefined exposure weight map. In other mode or implementation of the method, the user is allowed to input the weights for the enhancement support image through a user interface, thereby providing finer user control on the HDR processing.

In contrast to conventional systems, the method allows the user to interactively select desired regions of image and thereby enhancing dynamic range of those selected regions without affecting the overall dynamic range of the image. By way of an example and not limitation, a user may elect to change the lighting or colors (e.g., range, shift and so forth) on certain selected regions of the image only, as opposed to applying the adjustments globally to all the parts of image according to the conventional systems practice.

According to the proposed method, a user is allowed to select one or more regions having similar properties or characteristics, at one time for modification or enhancement. By way of an example and not limitation, regions of the image may comprise of objects or regions having similar exposure or similar color. These objects or regions may comprise at least one of: human faces, texture regions and homogenous regions.

In an embodiment, a capturing device can be a digital camera, a mobile device incorporating a camera, camcorders, a smart phone, a tablet, an electronic gadget or any other device capable of capturing exposure bracketed image set. For the sake of simplicity of description, details are not provided herein for performing image capturing operations which are known to those of ordinary skilled in the art.

In an embodiment, a user interface can be a touching mechanism, a mouse pointer or any other interface capable of interacting with an interactive display.

Throughout the description, the terms Image display module and Interactive display are used interchangeably.

Referring now to the drawings, and more particularly to FIG. 1 through 8, where similar reference characters denote corresponding features consistently throughout the figures, there are shown various embodiments.

FIG. 1 illustrates a general block diagram of present disclosure, according to embodiments as disclosed herein. The figure depicts an image dynamic range enhancing apparatus 100 comprising an image capturing module 101, an image display module 102 and an image processing module 103. The image capturing module 101 captures plurality of images of same scene at a range of different exposures. These images comprise an auto exposure image, at least one low exposure image and at least one high exposure image. The image display module 102 allows the user to interact with the display through different user interfaces, and displays the received image and user desired image editing functionalities including mode of operation. By way of an example and not limitation, image editing functionalities, according to embodiments described herein, comprises an exposure factor, brightness, color saturation and sharpness. The image processing module 103 is configured to processes selected regions of reference image displayed on the image display module 102 to enhance the local dynamic range of selected regions of the image without affecting the overall dynamic range of the image.

Figure 2:
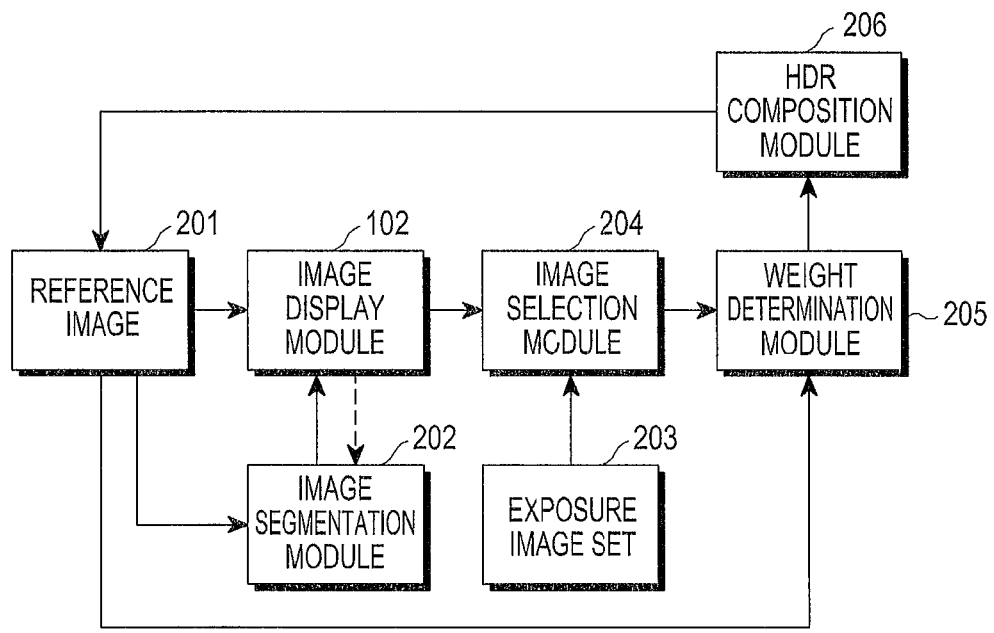
FIG. 2 illustrates a complete block diagram of the apparatus for enhancing local dynamic range of an image in a manual dynamic range enhancement mode, according to embodiments disclosed herein.
Figure 3:
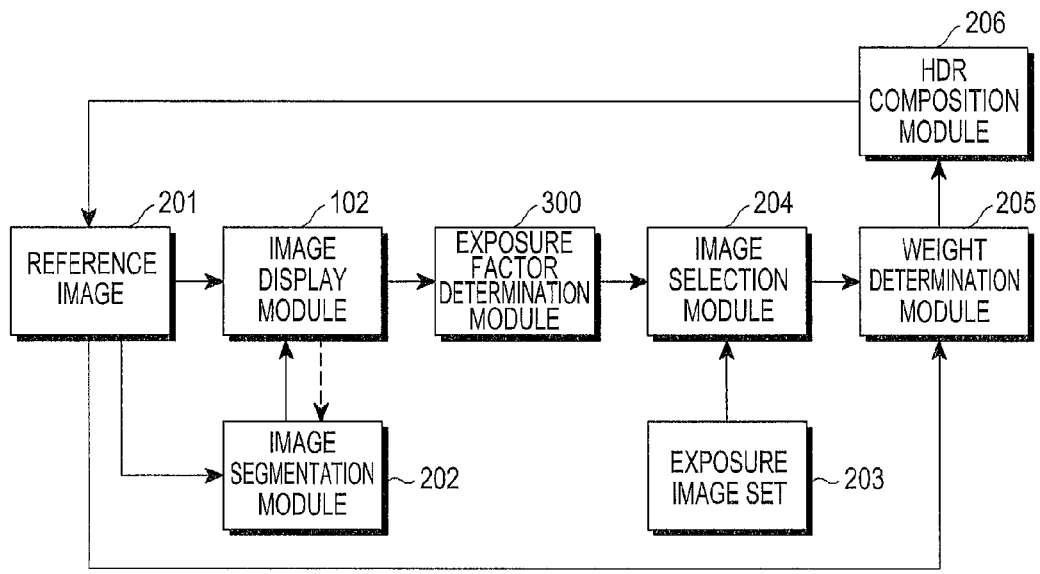
FIG. 3 illustrates a complete block diagram of the apparatus for enhancing local dynamic range of an image in an auto dynamic range enhancement mode, according to embodiments disclosed herein.

FIG. 2 and FIG. 3 illustrate embodiments of the apparatus of the present disclosure in auto dynamic range enhancement mode and manual dynamic range enhancement modes, respectively.

Apparatus is configured to receive the reference image 201 from the user as an input, by way of an example and not limitation, the reference image can be captured auto exposure image or a tone mapped high dynamic range image. Interactive display 102 is configured to display the received reference image and the apparatus further allows the user to interact with the display through interfaces such as through touch mechanism, a mouse pointer or any other interface capable of interacting with the interactive display. The apparatus is further configured to receive user requests for enhancement in brightness, dynamic range, and color saturation, ghosting artifacts removal, sharpness and other image editing functionalities through user interface. Using the user interface, a user selects plurality of regions of reference image having similar properties or characteristics for enhancement. Regions having similar characteristics can be selected at a time for enhancement, whereas regions having different characteristics can be enhanced in a separate selection. Multiple times selection for enhancement can be performed to any region.

The image processing module (103) comprises a region selection apparatus, an image selection module 202a weight determination module 205 and a HDR composition module 206. The region selection apparatus comprises an image segmentation module 204 that receives the reference image 201. The Image segmentation module 202 is configured to receive the reference image 201 and segments selected regions in the image based on exposure weights, by determining the pixel cluster of selected regions and using predefined weight map of auto exposure image of FIG. 4. By way of an example and not limitation, the image segmentation module 202 segments the reference image 201 by using exposure weights.

Image processing module 103 utilizes plurality of differently exposed images 203 to enhance the reference image 201 either by determining exposure weights using exposure factor determination module 300 or by using weights in the form of exposure factor or enhancement factor inputted by the user, i.e., the image processing module 103 is configured to process the reference image in auto dynamic range enhancement mode or in the manual dynamic range enhancement mode, respectively, based on the user request.

Image selection module 204, receives exposure bracketed image set 203, exposure factor and a mode of operation. Upon receiving, selection module 204 is configured to select appropriate enhancement support image from exposure image set, to combine with the reference image for the user desired enhancement.

The weight determination module 205 receives selected enhancement support image and exposure factor, and is configured to generate weight maps for selected regions in the enhancement support image and the reference image. In auto dynamic range enhancement mode, weights for the enhancement support image are determined based on predefined asymmetrical exposure weight maps of low and high exposure images of FIG. 4. In manual dynamic range enhancement mode, weight map of the enhancement support image is determined based on the user provided exposure factor received by the user through a user interface in the form of positive or negative percentage. The weight determination module may generate a binary weight when ghost removal mode and continuous weights when dynamic range enhancement modes.

The HDR composition module 206 is configured to receive the generated weight maps of the reference image and the enhancement support image and then combines the differently exposed images to generate an enhanced HDR image either by using exposure fusion or tone mapping technique.

The apparatus works in closed loop mode where generated HDR image is referred to the interactive display for further enhancement, if required. Apparatus further provides an option to the user to save the generated image.

Figure 4:
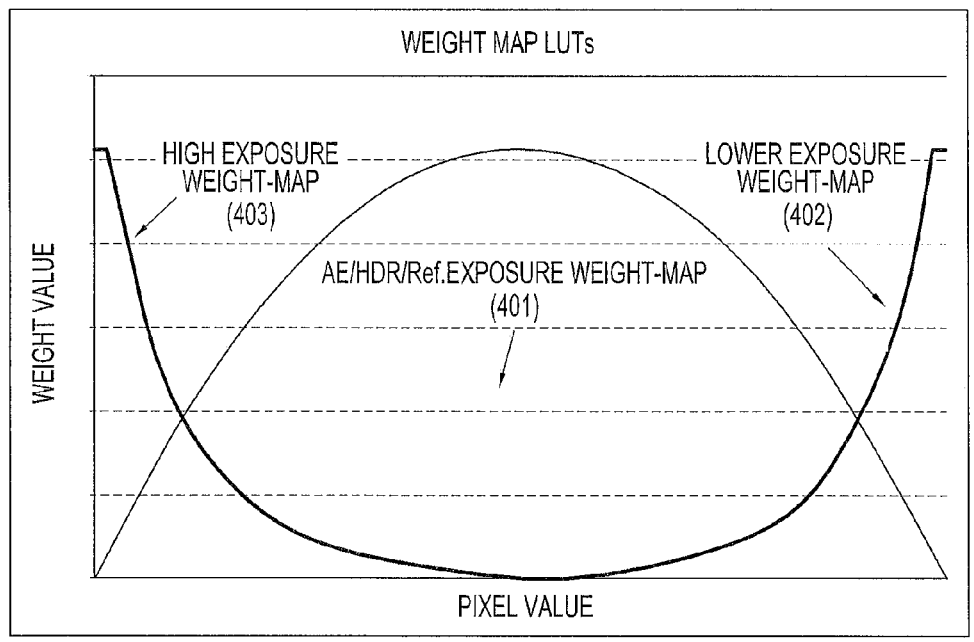
FIG. 4 illustrates examples of predefined weight maps for different input images, according to embodiments as disclosed herein.

FIG. 4 illustrates examples of predefined weight maps for different input images, according to embodiments as disclosed herein. HDR image is synthesized by weighted combination of input images. These weights are determined from weight maps, which are data generated from different response function. The weight maps could be predetermined and stored as look-up tables. The auto exposure/HDR image weight map 401 is generated using a symmetrical Gaussian distribution function given as $$f(x) = a * e^{-\frac{(x-b)^2}{2c^2}}$$

where, a is the scale of the functions, b is the mean and c is the standard deviation and x belongs to the interval (0,1) which is mapped for 8-bit pixel representation with values ranging between 0-255. For the auto exposure/HDR weight map 401 a mean of 0.5, scale of 1 and standard deviation of 0.5 is used. Also, the auto exposure image weight map 401 can be generated from an asymmetrical function using a Rayleigh function given as $$f(x, \alpha) = \frac{x}{\alpha^2} e - x^2/2\alpha^2, x \geq 0,$$

Where, α is the scale parameter whose value is experimentally chosen to best suit the sensor response and the exposure time used for capturing the low exposure image. The f(x, α) can exceed the scale or data range R or any normalizing for the chosen α.

$$f_{Weight}(x, \alpha) = \begin{cases} f(x, \alpha), & f(x, \alpha) \le R \\ R, & f(x, \alpha) > R \end{cases}$$

The low exposure image weight map 402 is generated using power response function given by $$f(x)=mx^y, m>0, y>0$$

Where, m and y are the scale and power parameter, respectively, whose values are experimentally chosen. The x refers to the interval (0, 1), which is mapped from pixel range (0, 255). The high exposure image weight map 403 is computed using function given by $$f(x)=m(1-x^y), m>0, y>0$$

Figure 5:
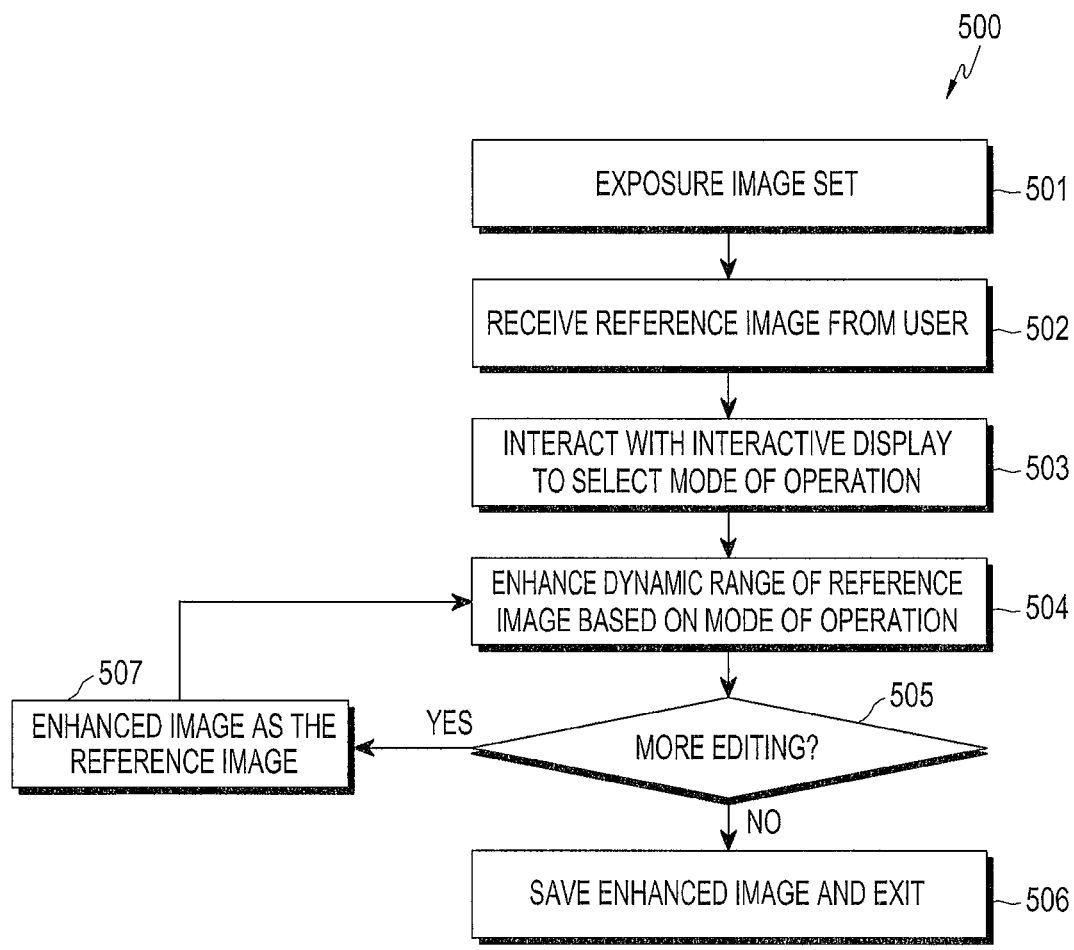
FIG. 5 illustrates a flow diagram explaining method of enhancing dynamic range of an image, according to embodiments disclosed herein.

FIG. 5 illustrates a flow diagram explaining method of enhancing the dynamic range of image of the present disclosure according to embodiments as disclosed herein. As depicted in the flow diagram 500, at operation 501, exposure bracketed image set 203 comprising a plurality of images of same scene captured across various exposures levels of camera are received from the user. Next at operation 502, the reference image whose dynamic range is to be enhanced is received by the user and it is referred to the interactive display 102. A user interacts with interactive display 102 through the user interface at operation 503, thereby selects desired mode of operation comprising: the auto dynamic range enhancement mode, manual dynamic range enhancement mode, and ghosting artifacts reduction mode.

Based on the selected mode of operation, the image processing module 103 processes the received image 201 and thereby outputting the enhanced dynamic range of said received image as stated in operation 504. The method in accordance with embodiments of the present method further provides an option to check the quality of generated enhanced output image, as stated at operation 505. If further enhancement is required, method repeats the operation 504 by considering generated enhanced reference image as the reference image for further enhancement, as stated at operation 507. At operation 506, the method allows the user to save the generated enhance output image, if enhanced output image meets the user desired requirements. The various actions in flow diagram 500 may be performed in the order presented, in a different order or simultaneously. Further, in some embodiments, some actions listed in FIG. 5 may be omitted.

Figure 6:
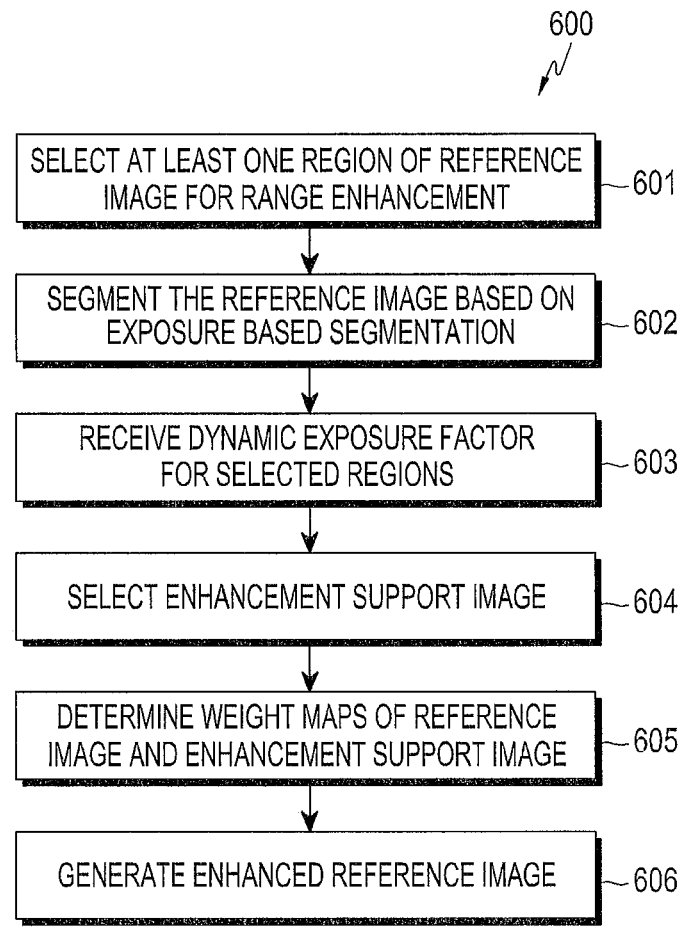
FIG. 6 illustrates a flow diagram explaining method of image processing in the auto dynamic range enhancement mode, according to embodiments disclosed herein.

FIG. 6 illustrates a flow diagram explaining an operation of image processing module (504) as described in FIG. 5, in manual dynamic range enhancement mode. As depicted in the flow diagram 600, at operation 601, a user interacts with interactive display 102 and thereby selects at least one region of the image having similar characteristics to be enhanced. At operation 602, the received image 101 is referred to the region selection apparatus and thereby to the image segmentation module 202 for segmenting the regions in the image based on exposure weights by determining the pixel cluster using predefined asymmetrical weight map, i.e., auto exposure or high dynamic range image (AE/HDR image) of FIG. 4. At operation 603, a user inputs at least one of: desired enhancement factor or exposure factor of selected regions and also other image editing functionalities. The segmentation may be performed using different techniques. By way of an example and not limitation the image segmentation is performed based on exposure weights. However a color or image texture based segmentation may be employed if the selected region is for object based enhancement. As stated above, segmentation may be performed on the entire image before the user interaction. Alternatively, the segmentation may be performed around the user selected region by using region growing algorithm to determine the pixel cluster.

Upon selecting regions to be enhanced and receiving dynamic exposure factor or enhancement factor of the regions, the image selection module 204 selects the enhancement support image from the exposure bracketed image set 203 by determining average exposure weights of all pixels in selected regions, as stated at operation 604. The Image selection module 204 determines exposure weights of all the pixels in selected regions of high exposure captured images using predefined asymmetrical weight maps of high exposure image (HE image) of FIG. 4, and selects the high exposure image having highest average exposure weight as enhancement support image, if a user inputs the positive percentage. If the user inputs a negative percentage, then the method determines exposure weights of all the pixels in selected regions of low exposure captured images using asymmetrical weight maps of low exposure image (LE image) of FIG. 4, and selects the low exposure image having maximum exposure weight as enhancement support image. For example, if a user uses increasing dynamic range of selected regions, then the method selects image giving highest average exposure weight in all captured high exposure images and if the user uses decreasing dynamic range of selected regions, then the method selects image giving highest average exposure weight in all captured low exposure images, and selects corresponding image as the enhancement support image.

In response to the selection of the enhancement support image by the image selection module 204 at operation 604, the weight determination module 205 receives both the enhancement support image and the reference image. Further the weight determination module 205 generates weight maps for both images, as stated at operation 605. The weight determination module 205 assigns a user provided dynamic enhancement factor or exposure factor as weights for all the pixels in selected region, and zero as weight in unselected regions of enhancement support image to remove the affect of unselected regions of the enhancement support image on the unselected regions of the reference image. The weight map for reference image 201 is determined by calculating the difference between the highest possible weights and the weights of the enhancement support image for each pixel in selected and unselected regions, and assigns said calculated difference as weights for the pixels of the reference image.

In response to generation of weight maps for the reference image 201 and the enhancement support image at operation 605, the HDR composition module 206 generates enhanced dynamic range image by processing the weight maps of both received image 201 and enhanced dynamic range as stated at operation 606. The operation of processing comprises smoothening weights of weight maps across a finite neighborhood for smooth blending using multi-resolution Gaussian pyramid diffusion. The amount of smoothening is controlled by defining the number of levels of diffusion, which in turn is decided by the average intensity difference between the pixels in the selected region and its neighborhood. Larger the intensity difference, higher is number of levels. The weight spreading using gaussian pyramids ensure smooth blending of images without any blocking artifacts at the boundaries. The various actions in flow diagram 600 may be performed in the order presented, in a different order or simultaneously. Further, in some embodiments, some actions listed in FIG. 6 may be omitted.

Figure 7:
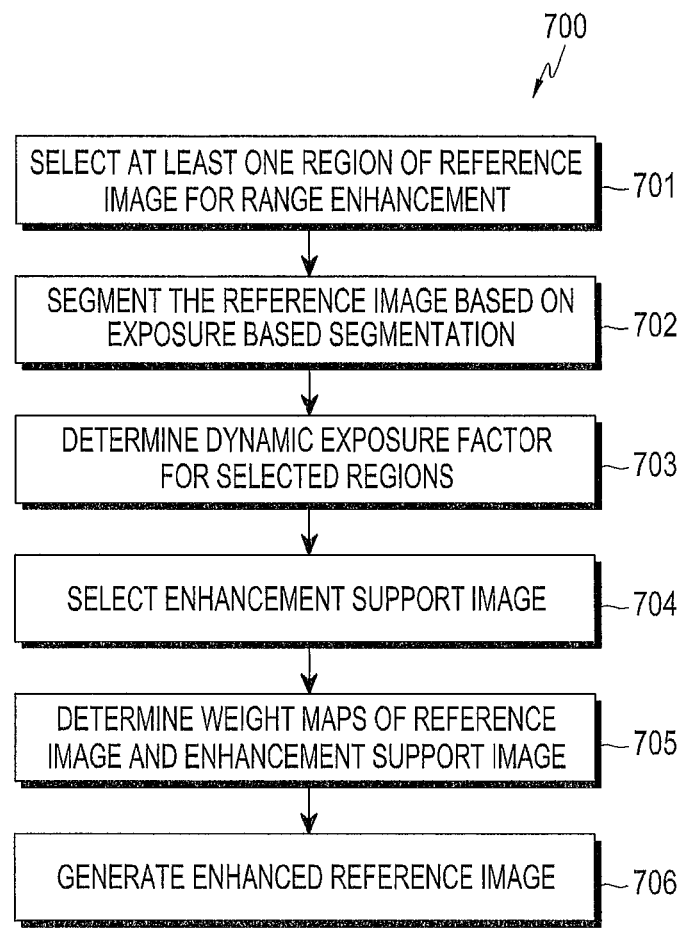
FIG. 7 illustrates a flow diagram explaining method of image processing in manual dynamic range enhancement mode, according to embodiments disclosed herein.

FIG. 7 illustrates a flow diagram explaining a operation of image processing module (504) as described in FIG. 5, in auto dynamic range enhancement mode. As depicted in the flow diagram 700, at operation 701, a user interacts with interactive display 102 and thereby selects at least one region of the image having similar characteristics to be enhanced. At operation 702, the received image is referred to the region selection apparatus and thereby to the image segmentation module 202 for segmenting the regions in the image based on exposure weights by determining the pixel cluster using predefined asymmetrical weight map, i.e., auto exposure or high dynamic range image (AE or HDR image) of FIG. 4. The method determines dynamic enhancement factor 300 of selected regions based on exposure weights of all pixels in selected regions of the reference image at operation 703 using predefined asymmetrical weight map, i.e., auto exposure or high dynamic range image (AE or HDR image) of FIG. 4. As stated above, the segmentation may be performed on the entire image before the user interaction or the segmentation may be performed around the user selected region by using region growing algorithm to determine the pixel cluster. A color-texture based segmentation may be employed if the desired region selection is for object based enhancement.

Upon selecting regions to be enhanced and dynamic exposure factor of said regions at operation 703, the image selection module 204 selects the enhancement support image from the exposure set by determining exposure weights of all pixels in selected regions, as stated at operation 704. The image selection module 204 determines average exposure weights of the pixels in selected regions of the reference image, captured high exposure and low exposure images using predefined asymmetrical weight maps, and selects the image having highest average exposure weight as enhancement support image.

In response to the selection of appropriate enhancement support image by the image selection module 204, the weight determination module 205 receives both the enhancement support image and the reference image 201, and generates weight maps for both the images, as stated at operation 705. The weight determination module 205 calculates weights of all pixels of selected regions of enhancement support image and the reference image based on the predefined asymmetrical weight map curves of FIG. 4, and assigns weights of all pixels of unselected regions of enhancement support image as zero and as maximum weight for all pixels of unselected regions of the reference image.

In response to generation of weight maps for the reference image 201 and the enhancement support image at operation 705, the HDR composition module 206 generates enhanced dynamic range image by processing the weight maps of both received image 201 and enhanced dynamic range as stated at operation 706. The operation of processing comprises smoothening weights of weight maps across a finite neighborhood for smooth blending using multi-resolution Gaussian pyramid diffusion. The amount of smoothening is controlled by defining the number of levels of diffusion, which in turn is decided by the average intensity difference between the pixels in the selected region and its neighborhood. Larger the intensity difference, higher is number of levels. The weight spreading using Gaussian pyramids ensure smooth blending of images without any blocking artifacts at the boundaries. The various actions in flow diagram 700 may be performed in the order presented, in a different order or simultaneously. Further, in some embodiments, some actions listed in FIG. 7 may be omitted.

Figure 8:
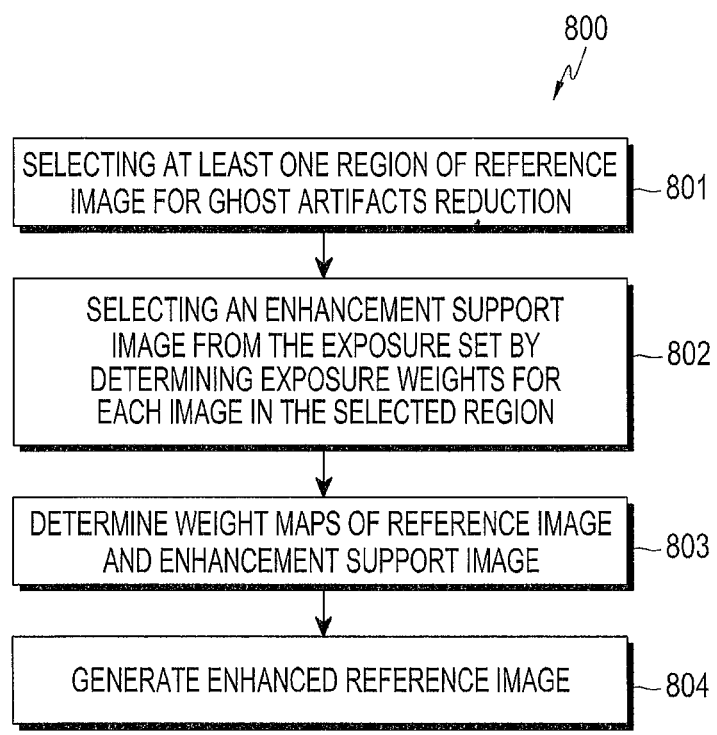
FIG. 8 illustrates a flow diagram explaining method of image processing in ghosting artifacts reduction mode, according to embodiments disclosed herein.

FIG. 8 illustrates a flow diagram explaining a operation of image processing module (504) as described in FIG. 5, in ghosting artifacts reduction mode. As depicted in the flow diagram 800, at operation 801, a user interacts with interactive display and thereby selects ghost region of the image having ghosting artifacts.

Upon selecting at least one ghost region, the image selection module 204 selects the enhancement support image form the exposure set by determining exposure weights of all pixels in selected regions, as stated at operation 802. The Image selection module 204 determines the average exposure weights of all the pixels in the selected regions of high exposed and low exposed captured images, and selects the image having highest average exposed weight as the enhancement support image.

In response to the selection of appropriate enhancement support image by the image selection module 204, the weight determination module 205 receives both the enhancement support image and the reference image 201, and generates weight maps for both the images, as stated at operation 803. The weight determination module 205 assigns maximum weight for all the pixels in the selected regions in the enhancement support image, and as zero for all remaining unselected regions of the image, and determines the weights of the reference image by inversing the weights of enhancement support image.

In response to generation of weight maps for the reference image 201 and the enhancement support image at operation 803, the HDR composition module 206 generates enhanced dynamic range image by processing the weight maps of both received image and enhanced dynamic range as stated at operation 804. The operation of processing comprises smoothening weights of weight maps across a finite neighborhood for smooth blending using multi-resolution gaussian pyramid diffusion. The amount of smoothening is controlled by defining the number of levels of diffusion, which in turn is decided by the average intensity difference between the pixels in the selected region and its neighborhood. Larger the intensity difference, higher is number of levels. The weight spreading using Gaussian pyramids ensure smooth blending of images without any blocking artifacts at the boundaries.

In response to the operation 804, the present method checks the quality of ghosting and repeats the operations 801 to 804 by taking output enhanced image as reference image to further improve the quality of the image. If generated image meets the desired requirements, method allows the user to save the generated image without repeating method operations.

FIG. 9A-9E illustrates an example method for enhancing dynamic range of bright regions of an image, according to embodiments disclosed herein. FIG. 9A and FIG. 9B show an auto image and HDR image, respectively, of a captured image by a user. The user selects the brighter region of the HDR image for dynamic range enhancement as shown in FIG. 9C. In response to region selection, proposed method performs exposure based segmentation over the selected region, and receives or calculates dynamic exposure factor for those selected regions based on the mode of operation. FIG. 9D depicts the image upon performing segmentation over selected region. In response to the segmented image, the method selects appropriate enhancement support image from the exposure bracketed image set and thereby determines weight maps of the captured HDR image and the enhancement support image. Further the method generates enhanced dynamic range of the HDR image as depicted in FIG. 9E.

FIG. 10A-10E illustrates an example method for enhancing dynamic range of darker regions of an image, according to embodiments disclosed herein. FIG. 10A and FIG. 10B shows auto image and HDR image, respectively, of a captured image by a user. The user selects the brighter region of the HDR image for dynamic range enhancement as shown in FIG. 10C. In response to region selection, proposed method performs exposure based segmentation over the selected region, and receives or calculates dynamic exposure factor for those selected regions based on the mode of operation. FIG. 10D depicts the image upon performing segmentation over selected region. In response to the segmented image, the method selects appropriate enhancement support image from the exposure bracketed image set and thereby determines weight maps of the captured HDR image and the enhancement support image. Further the method generates enhanced dynamic range of the HDR image as depicted in FIG. 10E.

Figure 11A:
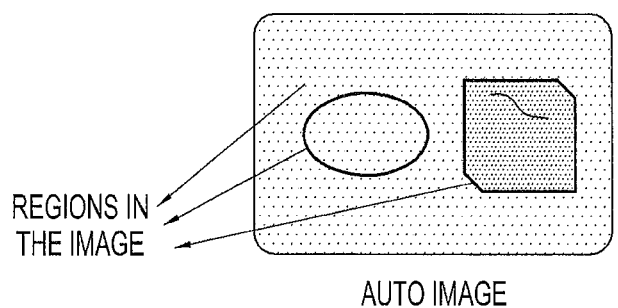
FIG. 11A-11D illustrates an example method for reducing ghosting artifacts in an image, according to embodiments disclosed herein.
Figure 11B:
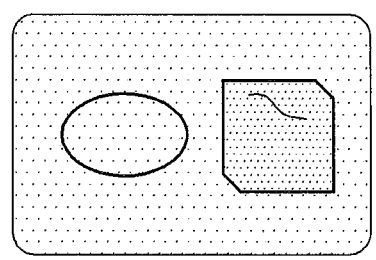
Figure 11C:
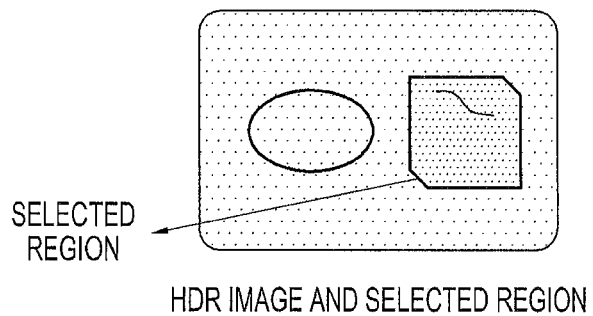
Figure 11D:
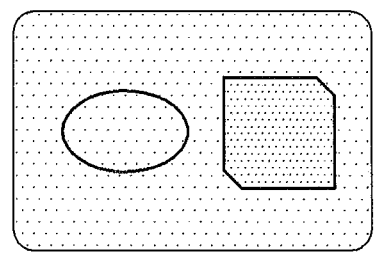

FIG. 11A-11D illustrates an example method for reducing ghosting artifacts in selected region of an image, according to embodiments disclosed herein. FIG. 11A and FIG. 11B shows auto image and HDR image, respectively, of a captured image by a user. The user selects the region of the HDR image for de-ghosting as shown in FIG. 11C. In response to the selected region, the method selects appropriate enhancement support image from the exposure bracketed image set and thereby determines weight maps of the captured HDR image and the enhancement support image. Further the method generates enhanced dynamic range of the HDR image as depicted in FIG. 11D.

The method and apparatus for enhancing the local dynamic range of the image of the present disclosure provide a number of benefits. A fast, simple and efficient means of user interaction is provided and with the selection of the image having highest exposure weight in selected region as the enhancement support image results in more contribution for enhancing the dynamic range compared to other images in exposure bracketed image set. In addition to this, asymmetrical weighting allows preferential weighting of brighter regions in low exposure image and darker regions in high exposure image thereby resulting in high dynamic range when combining the enhancement support image with the reference image. Further, proposed method and apparatus provides a segmentation based region selection that eases the complexity for the user for selecting regions. It is further effective in selecting all the pixels in the given region and demarking the region boundaries.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various embodiments, those skilled in the art will recognize that the embodiments herein can be practiced with modification within the spirit and scope of the embodiments as described herein.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for enhancing dynamic range of a reference image, wherein the method comprises:
    selecting at least one region of the reference image for enhancement;
    segmenting the reference image by using exposure weights;
    selecting an enhancement support image from an exposure bracketed image set;
    determining weight maps of the selected at least one region of the reference image and the enhancement support image; and
    generating an enhanced dynamic range for the reference image by processing the determined weight maps.

2. The method according to claim 1, wherein the exposure bracketed image set comprises a plurality of images of a same scene captured at a range of different exposures.

3. The method according to claim 2, wherein the plurality of images comprises an auto exposure image, at least one low exposure image, and at least one high exposure image.

4. The method according to claim 3, wherein the reference image is at least one of the auto exposure image and a tone mapped high dynamic range image.

5. The method according to claim 3, wherein segmenting the reference image is performed using a predefined asymmetrical weight map of the auto exposure image.

6. The method according to claim 1, wherein the selected at least one region of the reference image includes regions with one of similar exposure and similar color.

7. The method according to claim 1, further comprising:
    providing an option for a user to input desired image editing functionalities, wherein the image editing functionalities comprise at least one of: a local dynamic range enhancement factor, an exposure factor of the regions and a desired mode of operation.

8. The method according to claim 7, wherein the desired mode of operation comprises at least one of: a manual dynamic range enhancement mode, an auto dynamic range enhancement mode and a ghosting artifacts reduction mode.

9. The method according to claim 8, wherein selecting the enhancement support image from the exposure bracketed image set in the auto dynamic range enhancement mode comprises:
    determining average exposure weights of all pixels in the selected at least one region of the reference image, each one of a captured high exposure images and each one of a captured low exposure images using predefined asymmetrical weight maps; and
    selecting an image comprising a highest average exposure weight as the enhancement support image.

10. The method according to claim 8, wherein selecting the enhancement support image from the exposure bracketed image set in the manual dynamic range enhancement mode comprises:
    receiving the local dynamic range enhancement factor used for the selected at least one region from a user, wherein the received local dynamic range enhancement factor is in one of: a positive percentage or a negative percentage;
    when the local dynamic range enhancement factor is the positive percentage, determining exposure weights of all pixels in the selected at least one region of each one of the captured high exposure captured images using a predefined asymmetrical weight map of a high exposure image, and selecting the high exposure image comprising a highest exposure weight as the enhancement support image; and when the local dynamic range enhancement factor is the negative percentage, determining exposure weights of all the pixels in the selected at least one region of each one of the captured high exposure images using a predefined asymmetrical weight map of low exposure image, and selecting a low exposure image having maximum exposure weight as enhancement support image.

11. The method according to claim 1, wherein determining the weight maps of the reference image and the enhancement support image in the auto dynamic range enhancement mode comprises:
calculating weights of all pixels of the selected at least one region of the enhancement support image and the reference image based on the predefined asymmetrical weight maps; and
assigning weights of all pixels of unselected regions of the enhancement support image as zero and as maximum for weights of all pixels of unselected regions of the reference image.

12. The method according to claim 8, wherein determining the weight maps of the reference image and the enhancement support image in the manual dynamic range enhancement mode comprises:
assigning a user provided the dynamic range enhancement factor as weights for all the pixels in selected region, and zero as weight in unselected regions of the enhancement support image;
calculating a difference between highest possible weights and the exposure weights of the enhancement support image for each pixel in selected and unselected regions; and
assigning the calculated difference as weights for the pixels of the reference image.

13. The method according to claim 1, wherein the generating the enhanced dynamic range comprises:
smoothening the weight maps of the reference image and the enhancement support image; and
combining and averaging the weight maps of the reference image and the enhancement support image to generate the enhanced dynamic range.

14. A method for reducing ghosting artifacts of a reference image, wherein the method comprises:
selecting at least one region of the reference image for ghosting artifacts removal;
selecting an enhancement support image from an exposure bracketed image set;
determining weight maps of the selected at least one region of the reference and enhancement support images; and
generating an enhanced reference image by reducing the ghosting artifacts by processing the determined weight maps.

15. The method according to claim 14, wherein the exposure bracketed image set comprises a plurality of images of a same scene captured at a range of different exposures.

16. The method according to claim 15, wherein the plurality of images comprises at least one of an auto exposure image, at least one low exposure image, and at least one high exposure image.

17. The method according to claim 16, wherein the reference image is at least one of the auto exposure image and a tone mapped high dynamic range image.

18. The method according to claim 17, wherein selecting the enhancement support image comprises:
determining average exposure weights of all pixels in the selected at least one region of each one of a captured high exposure image and a captured low exposure image; and
selecting the image comprising a highest average exposed weight as the enhancement support image.

19. The method according to claim 18, wherein determining weight maps of the reference image and the enhancement support image comprises:
setting a maximum weight for all the pixels in the selected at least one region in the enhancement support image, and setting a zero weight for all remaining unselected regions of the enhancement support image; and
determining weights of the reference image by inversing the determined weights of the enhancement support image.

20. The method according to claim 17, wherein generating the enhanced reference image comprises:
smoothening the weight maps of the reference image and the enhancement support image; and
combining and averaging smoothened weight maps of the reference image and the enhancement support image to generate the enhanced dynamic range.

\* \* \* \* \*